March 1, 1927.
G. R. MIDDLETON
SLIP COVER FASTENER
Filed Oct. 18, 1926
1,619,265
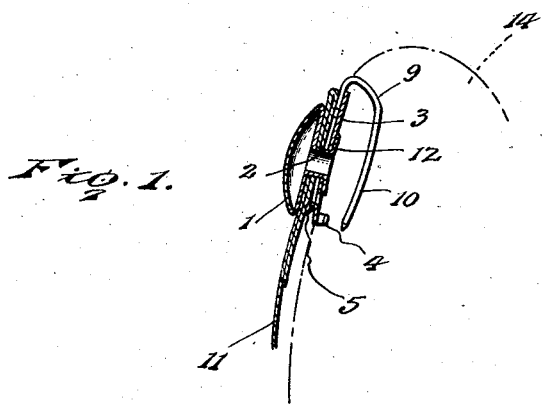
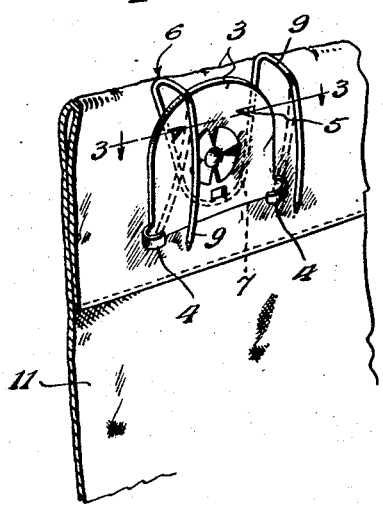
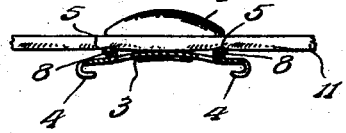
Inventor
G. R. Middleton.
By Lacy & Lacy, Attorneys Patented Mar. 1, 1927.

1,619,265

UNITED STATES PATENT OFFICE.

GEORGE ROLAND MIDDLETON, OF TAMPA, FLORIDA.

SLIP-COVER FASTENER.

Application filed October 18, 1926. Serial No. 142,378.

The present invention is directed to improvements in slip cover fasteners.

The primary object of the invention is to provide a fastener of this character more particularly designed for use in connection with the slip covers of the seats of automobiles in order that the slip cover provided with such fasteners can be easily and quickly attached to the seat of the automobile to cover and protect the original covering of the seat.

Since it is necessary at times to remove the slip covers from the seats to clean or thoroughly dust them, it is essential that the pins of the fasteners be protected in order to prevent injury to the cleaner, and to eliminate the possibility of injury, means are provided to securely retain the pins in protected positions.

Another object of the invention is to provide a fastener of this kind which can be securely attached to the slip covers and, when in place thereon, will be so secured as to eliminate the possibility of tearing or ripping the covers when the same are stretched upon the automobile seat and subjected to strain.

In the accompanying drawing:

Figure 1 is a detail sectional view taken vertically through the fastener, and showing the same in position upon an automobile seat, the seat being shown in dotted outline.

Figure 2 is a perspective view of the fastener showing the same engaged upon a marginal portion of a slip cover.

Figure 3 is a sectional view on the line 3—3 of Figure 2.

The fastener comprises a hollow head or button 1 having an integral hollow shank 2, and permanently secured to the head in a manner to be hereinafter explained is a plate 3, preferably of the shape shown.

This plate is provided at certain of its corners with keepers 4 and is further provided with struck-out tongues 5, preferably three in number, the purpose of which will later appear.

Used in connection with the head and plate is a fastening member designated generally by the numeral 6. This member is formed from a single length of resilient wire of suitable gage and is bent to provide a loop 7, the side arms 8 of which terminate in bowed portions 9, which in turn, terminate in pins 10. Since the side arms 8 of the loop are spaced the pins 10 will be disposed in spaced parallel relation, as clearly shown in Figure 2 of the drawing.

After the fastening member 6 has been bent to the desired shape, the loop 7 is placed against the inner side of the plate 3 and the tongues 5 bent into engagement with the bight portion and side arms thereof. In this manner the fastening member is rigidly united with the plate.

To apply the fastener to the slip cover 11, it is only necessary to pass the shank 2 through the material in order that the end of the shank will extend through the central opening 12 of the plate 3. The extended end of said shank is then upset, as indicated at 13, thus firmly gripping the marginal portions of the slip cover between the head 2 and plate 3.

Figure 1 of the drawings illustrates a manner in which the fastener operates, the pins thereof being shown in penetrating engagement with the upholstery of the seat 14, indicated in dotted lines.

As before stated, it is one of the objects of the invention to protect persons against injury by the pins 10 when the slip cover is being dusted or cleaned, after its removal from the automobile seat. Upon removal of the slip covers the pins 10 are bent so that their pointed ends will engage under the keeper 4, as shown in dotted lines of Figure 2 of the drawing. Since the keepers 4 are of sheet metal, ample area is provided to wholly protect the pointed ends of the pins.

Having thus described the invention, I claim:

1. A slip cover fastener comprising a head, a plate secured to the head, said plate having tongues carried thereby, a fastening member including a loop and pins, the loop being secured to the plate by the tongues to hold the pins in overlaying relation with respect to the plate.

2. A slip cover fastener comprising a head, a shank carried by the head, a plate secured to the shank, tongues carried by the plate, a fastening member including a loop having its side arms terminating in pins, the loop being secured to the plate by the tongues.

3. A slip cover fastener comprising a head, a plate secured to the head, said plate having tongues, a fastening member including a loop and pins, the loop being secured to the plate by the tongues, keepers carried by the plate and adapted to engage the pins when in their inoperative position.

In testimony whereof I affix my signature.

GEORGE ROLAND MIDDLETON. [L. S.]